United States Patent [19]

Morgan, Jr.

[11] 4,282,098

[45] Aug. 4, 1981

[54] FILTER TOP HINGE

[75] Inventor: Howard W. Morgan, Jr., Michigan City, Ind.

[73] Assignee: Filter Specialists, Inc., Michigan City, Ind.

[21] Appl. No.: 150,791

[22] Filed: May 19, 1980

[51] Int. Cl.³ .............................................. B01D 35/16
[52] U.S. Cl. .................................... 210/238; 210/232
[58] Field of Search ................... 292/256.75; 210/232, 210/237, 238, 246, 244, 541, 542

[56] References Cited

U.S. PATENT DOCUMENTS

| 242,578 | 6/1881 | Ames, Jr. ..................... 292/256.75 X |
| 922,508 | 5/1909 | Puffer ........................... 292/256.75 X |
| 2,752,187 | 6/1956 | Gordon .......................... 292/256.75 |
| 3,141,845 | 7/1964 | Nadherny ........................... 210/237 |
| 3,756,640 | 9/1973 | Johnson .......................... 292/256.75 |
| 4,081,379 | 3/1978 | Smith ................................. 210/232 |

Primary Examiner—Frank A. Spear, Jr.
Attorney, Agent, or Firm—Oltsch, Knoblock & Hall

[57] ABSTRACT

A hinge assembly for a filter housing cap. The hinge assembly also serves as a hold-down for the cap. With securing devices loosened, the cap may be lifted from its closed position and remain connected to the housing.

3 Claims, 8 Drawing Figures

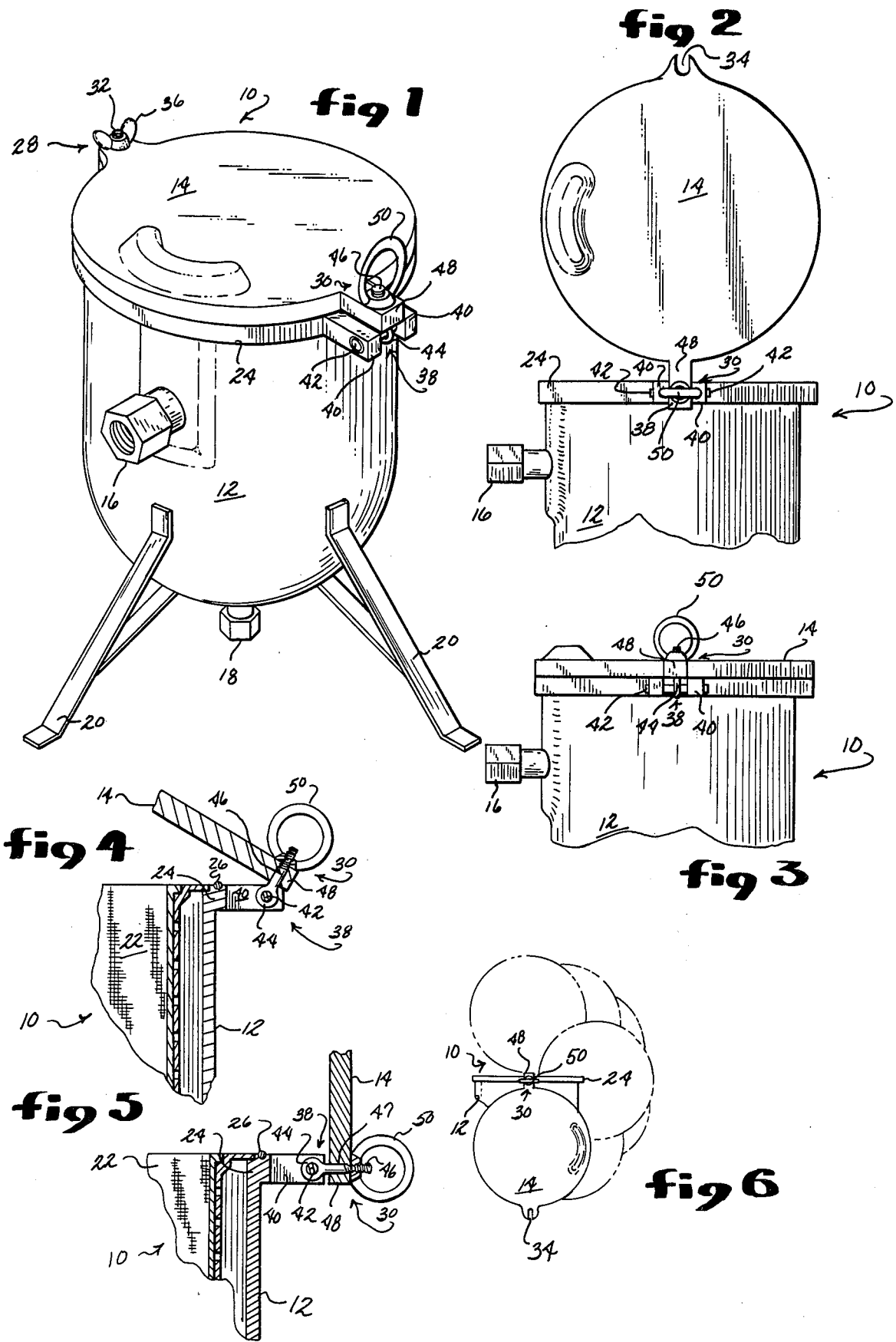

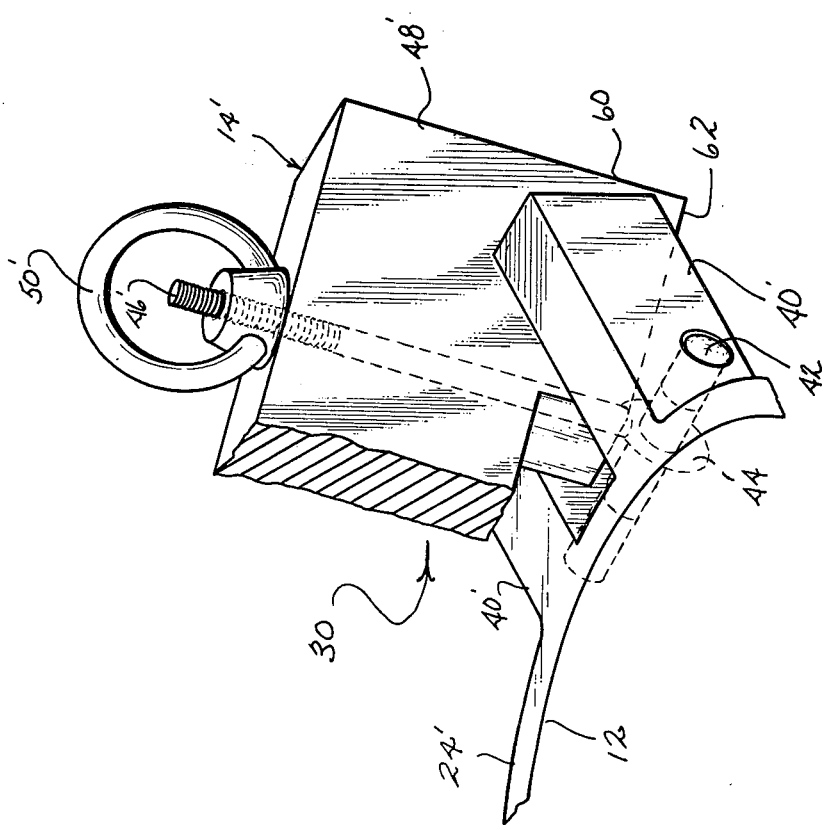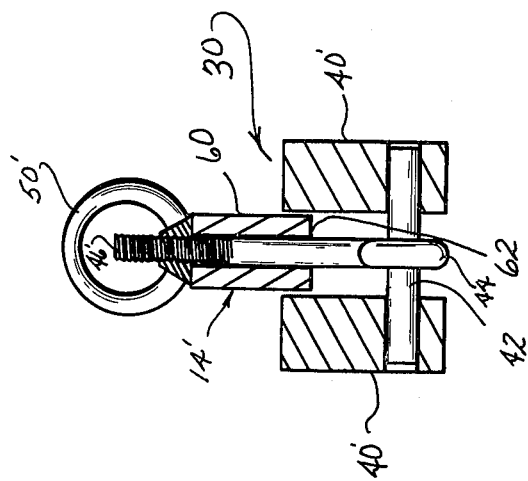

FILTER TOP HINGE

SUMMARY OF THE INVENTION

This invention relates to a hinge assembly for connecting a cap to a filter housing.

Previously, when it was desired to expose the inside of a filter housing, it was necessary to completely remove the cap. This often included complete removal of lugs and their nuts before the cap could be lifted. Also, a place had to be found to place the removed cap so that it would not be a hindrance. The present invention alleviates these problems by including a hinge assembly in one of the hold-downs of the housing. With this assembly it is no longer necessary to completely remove the cap to gain access into the filter housing. The cap is rotated away from the opening of the housing and suspended aside the housing. When it is desired to replace the cap, it need only be swung up and back into position.

Another embodiment of the invention includes an extension part of the cap at the hinge. The extension part is formed so as to prevent rotation of the cap about two axes and limits its rotation to about only one axis. The extension part also serves as a rest to hold the cap in position when it is lifted.

Accordingly, it is an object of this invention to provide a means for exposing the inside of a filter housing without completely detaching the top.

Another object is to provide a hold-down hinge assembly for a filter top.

Other objects will become apparent upon a reading of the following description.

BRIEF DESCRIPTION OF THE DRAWINGS

FIG. 1 is a perspective view of the filter with the cap closed.

FIG. 2 is a fragmental side view of the filter with the cap open and elevated.

FIG. 3 is a fragmental side view of the filter with the cap closed and secured by the hinge assembly.

FIG. 4 is a fragmentary sectional view of the filter at the hinge assembly with the cap partly opened.

FIG. 5 is a fragmentary sectional view like FIG. 4, but with the cap fully opened and elevated.

FIG. 6 is a fragmentary side view of the filter showing the cap rotated from its open position in FIGS. 2 and 5 into its lowered suspended position.

FIG. 7 is a fragmental perspective view of another embodiment of the filter with the cap thereof partly open.

FIG. 8 is a cross-sectional view of the embodiment in FIG. 7 showing the cap closed.

DESCRIPTION OF THE PREFERRED EMBODIMENTS

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

As shown in FIGS. 1-6, filter 10 is composed basically of a housing 12 and a cap 14. Housing 12 has an inlet 16, an outlet 18, and legs 20. A filtering element 22, which may include a generally rigid basket and a flexible filtering bag, inserts into housing 12. The upper edge of housing 12 has an enlarged rim 24 upon which cap 14 rests. An O-ring 26 forms a seal between cap 14 and rim 24 to prevent leakage. Liquid enters inlet 16, follows an internal passage into the interior of filtering element 22, through the filtering element and out outlet 18.

In order to keep cap 14 securely in place, hold-downs 28, 30 are attached to rim 24. Hold-down 28 functions with bolt 32 fitting into slot 34 and with nut 36 drawn down onto cap 14. Hold-down 30 is a part of a hinge assembly. The number of hold-downs 28, 30 can vary with the filter size.

The hinge assembly includes spaced tabs or extensions 40 of rim 24. A pin 42 is inserted through extensions 40. Pin 42 passes through ring 44 of a bolt 46 with the bolt being rotatable about the pin. Bolt 46 passes through a bore 47 in tongue 48 of cap 14. A ring nut 50 threadably fits onto the exposed threaded shank of bolt 46 to sealably secure cap 14 to housing 12.

To remove cap 14 from filter housing 12, nut 36 is removed from bolt 32 of hold-down 28. Ring nut 50 is loosened upon, but not removed from, bolt 46 of hold-down 30. With ring nut 50 sufficiently loosened, cap 14 may be lifted from contact with O-ring 26 and pivoted into its elevated position shown in FIGS. 2 and 5 with bolt 46 pivoting about pin 42. Pin 42 is located sufficiently close to the ends of extensions 40 to allow the cap to clear housing 12. When cap 14 has been raised to the position shown in FIGS. 2 and 5, it may be rotated about bolt 46 as shown in FIG. 6 into its lowered position. The interior of housing 12 is now readily accessible and filtering element 22 may be changed or cleaned or other maintenance functions performed. To replace cap 14, the preceding steps are reversed.

FIGS. 7 and 8 exhibit another hinge assembly. In this embodiment, the hinge assembly allows cap 14' to be pivoted up into a generally vertical position after nuts 36 of hold-downs 28 (not shown) are removed. The hinge assembly includes hold-down 30' and spaced extensions 40' as in the embodiment of FIGS. 1-6. Cap tongue 48' includes a leg part 60. Leg part 60 fits between spaced extensions 40' at housing rim 24'. When cap 14' is fully raised after loosening ring nut 50' upon bolt 46', face 62 of leg part 60 will abut filter housing 12 below its rim 24' with tongue 48' being retained between extensions 40' to maintain the cap in an upright position, thereby freeing the hands of the user. Leg part 60 of tongue 48' also prevents rotation of the cap when resting upon rim 24'.

It is to be understood that the invention is not to be limited to the details of the preceding description but may be modified within the scope of the appended claims.

What I claim is:

1. In a filter including a housing having an upper opening, a cap for spanning said housing upper opening, a liquid inlet into and outlet from said housing, a filtering element in said housing between said inlet and outlet, a plurality of securement means for releasably securing said cap to the housing when spanning said housing opening, the improvement wherein at least one of said securement means constitutes a hold-down hinge assembly, said hold-down hinge assembly comprising a bolt having a threaded shank and a head with a transverse opening, a nut which is threadably compatible with said bolt, a pin, said pin anchored to said housing and passing through said bolt head opening with clearance, said bolt being pivotal about said pin from an upright to a transverse position, a bore in said cap, said bolt shank passing through said cap bore with clearance, said nut threaded upon said bolt shank to secure said cap to the bolt, said nut being turnable against said cap when the cap spans said housing opening and said bolt is upright to secure the cap to the housing, said cap being first pivotal about said pin from its housing opening spanning position into an elevated position and then pivotal about said bolt in its said transverse position into a lowered position aside said housing with said nut loosened upon the bolt.

2. The filter of claim 1 wherein said housing includes spaced marginal tabs, said bolt head located between said tabs with said pin extending from one tab to the other tab.

3. In a filter including a housing having an upper opening, a cap for spanning said housing upper opening, a liquid inlet into an outlet from said housing, a filtering element in said housing between said inlet and outlet, a plurality of securement means for releasably securing said cap to the housing when spanning said housing open end, the improvement wherein at least one of said securement means constitutes a hold-down hinge assembly, said housing includes spaced marginal tabs, said cap includes a tongue having a leg part movably fitting between said spaced marginal tabs, said cap tongue and spaced marginal tabs forming a part of said hold-down hinge assembly, said hold-down hinge assembly including a bolt having a threaded shank and a head having a transverse opening, a nut which is threadably compatible with said bolt, a pin, said pin anchored to said housing and passing through said bolt head opening with clearance, said bolt head located between said spaced marginal tabs with said pin extending from one tab to the other, said bolt being pivotal about said pin from an upright to a generally transverse position, a bore in said cap tongue, said bolt shank passing through said cap tongue, said nut threaded upon said bolt shank to secure said cap to the bolt, said nut being turnable against said cap when the cap spans said housing opening and said bolt is upright to secure the cap to the housing, said cap being pivotal about said pin from its housing opening spanning position into an elevated position in which said cap leg part will abut said housing with said nut loosened upon the bolt.

* * * * *